(12) United States Patent
VanDenberg et al.

(10) Patent No.: US 8,727,363 B1
(45) Date of Patent: May 20, 2014

(54) SUSPENSION SYSTEM HAVING PARALLEL AIR SPRING AND RUBBER FORCE REACTION

(71) Applicant: Air Suspensions, Inc., Massillon, OH (US)

(72) Inventors: Ervin K. VanDenberg, Massillon, OH (US); David H. Croston, Navarre, OH (US)

(73) Assignee: Transportation Technologies, Inc., Massillon, OH (US)

( * ) Notice: Subject to any disclaimer, the term of this patent is extended or adjusted under 35 U.S.C. 154(b) by 0 days.

(21) Appl. No.: 13/669,778

(22) Filed: Nov. 6, 2012

(51) Int. Cl.
  *B60G 11/18* (2006.01)
  *B60G 11/64* (2006.01)

(52) U.S. Cl.
  USPC ............. 280/124.157; 267/273; 280/124.116; 280/124.166

(58) Field of Classification Search
  USPC .................. 267/273, 277, 279, 285; 280/789, 280/124.116, 124.125, 124.128, 124.13, 280/124.131, 124.153, 124.157, 124.166
  See application file for complete search history.

(56) References Cited

U.S. PATENT DOCUMENTS

| | | |
|---|---|---|
| 2,998,981 A | 9/1961 | Derr |
| 3,078,104 A | 2/1963 | Chalmers |
| 3,140,880 A | 7/1964 | Masser |
| 3,784,221 A | 1/1974 | Frasier, Sr. |
| 4,171,830 A | 10/1979 | Metz |
| 4,966,386 A | 10/1990 | Werdich |
| 5,161,814 A | 11/1992 | Walker |
| 5,163,701 A | 11/1992 | Cromley, Jr. |
| 5,263,736 A * | 11/1993 | Stevens ....................... 280/6.157 |
| 5,277,450 A | 1/1994 | Henschen |
| 5,366,237 A | 11/1994 | Dilling et al. |
| 5,411,268 A | 5/1995 | Nelson et al. |
| 5,411,287 A * | 5/1995 | Henschen .............. 280/124.169 |
| 5,427,404 A | 6/1995 | Stephens |
| 5,505,481 A | 4/1996 | VanDenberg et al. |
| 5,505,482 A | 4/1996 | VanDenberg |
| 5,540,454 A | 7/1996 | VanDenberg et al. |
| 5,683,098 A | 11/1997 | VanDenberg |
| 5,690,353 A | 11/1997 | Vandenberg |
| 5,718,445 A | 2/1998 | VanDenberg |
| 5,788,263 A | 8/1998 | VanDenberg |
| 5,820,156 A | 10/1998 | VanDenberg |
| 5,853,183 A | 12/1998 | VanDenberg |
| 5,899,470 A | 5/1999 | Heitzmann |
| 5,924,712 A | 7/1999 | Pierce |
| 6,340,165 B1 | 1/2002 | Kelderman |
| 7,726,674 B2 * | 6/2010 | VanDenberg et al. . 280/124.128 |

(Continued)

*Primary Examiner* — Paul N Dickson
*Assistant Examiner* — Laura Freedman
(74) *Attorney, Agent, or Firm* — Sand & Sebolt

(57) ABSTRACT

A suspension assembly for a vehicle including an elongated central torsion axle shaft of a rubber torsion axle assembly, a torsion axle shaft pivot point about which the torsion axle shaft pivots, a spring and an elongated spindle swing arm. The spring has a first end and a second end and the first end of the spring is connected to a fixed point relative to a vehicle frame. The spindle swing arm has a second end with the first end connected to the torsion axle shaft with the second end of the spindle swing arm connected to the second end of the spring. The spring can set the torsion axle shaft to a predetermined position, such as at or near a no-load position, when only static forces are present. This provides for a torsion axle with a greater range of movement and significantly improves its lifespan.

19 Claims, 13 Drawing Sheets

(56) References Cited

U.S. PATENT DOCUMENTS

| | | |
|---|---|---|
| 7,758,056 B2 | 7/2010 | VanDenberg et al. |
| 7,980,577 B2 * | 7/2011 | Vandenberg et al. .. 280/124.128 |
| 8,191,911 B1 * | 6/2012 | Reynolds ............... 280/124.166 |
| 8,226,098 B2 * | 7/2012 | VanDenberg et al. . 280/124.106 |
| 8,235,403 B2 * | 8/2012 | VanDenberg et al. . 280/124.116 |
| 8,256,782 B2 * | 9/2012 | VanDenberg et al. . 280/124.128 |
| 2010/0270769 A1 * | 10/2010 | VanDenberg et al. . 280/124.157 |

* cited by examiner

SUSPENSION SYSTEM HAVING PARALLEL AIR SPRING AND RUBBER FORCE REACTION

BACKGROUND

1. Technical Field

The invention relates to suspension methods and systems for vehicles, such as trailers and trucks. More particularly, the invention relates to a suspension assembly using a rubber torsion axle assembly in combination with an air spring. Even more particularly, the invention relates to a rubber and air suspension assembly that maximizes its performance by having the spindle ride in a predetermined position (that can be near a no-load position) to maximize the range of motion of a central torsion axle shaft of the torsion axle assembly and the life of the torsion axle.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not have hit a bump or rut at the same time. This torsion axle concept operates to keep a trailer moving as straight as possible behind a towing vehicle as well as absorb some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Torsion axles are constructed of a square axle in cross section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after bending. It is also known to use air bags for straight, non-torsion axles, such as shown in U.S. Pat. Nos. 3,784,221 and 5,427,404. While it is true that both the torsion axle technology and the air bag technology has been quite successful independently in making a smoother ride as well as enhancing the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring. U.S. Pat. No. 7,758,056 improves upon the system of U.S. Pat. No. 6,340,165 by providing a more rugged and compact structure by combining the pivot for both the torsion axle and connected spindle swing arm and the air spring mounting arm on a common axis. However, the spindle of the suspension of U.S. Pat. No. 7,758,056 rides a load position where the torsion axle is already partly compressed limiting the range of motion of the spindle with respect to the no-load position. Therefore, a better suspension system is needed.

BRIEF SUMMARY OF THE INVENTION

The preferred embodiment of the present invention is a suspension assembly for a vehicle/trailer. The suspension assembly operates with an elongated central torsion axle shaft that is part of a rubber torsion axle assembly. The torsion axle shaft is configured to pivot about a torsion axle shaft pivot point. The suspension assembly also includes a spring with a first end and a second end. The first end of the spring is connected to a fixed point relative to a vehicle frame. For example the first end of the spring can be connected to a mounting bracket that is connected to the frame of the vehicle or trailer. An elongated spindle swing arm has a first end and a second end. The first end of the spindle swing arm is connected to the torsion axle shaft and the second end of the spindle swing arm is connected to the second end of the spring.

The rubber torsion axle assembly includes an outer tube and rubber torsion springs located in the outer tube between the torsion axle shaft and the outer tube. In some configurations of the preferred embodiment, the spring sets the torsion axle shaft to a static predetermined position when no dynamic forces are being encountered. For example, the predetermined position can be near a no-load position where the no-load position relieves the rubber torsion springs of static force and supplements the force of the rubber torsion springs in reacting dynamic loads. By unloading the static loads from the rubber torsion springs, the life of the rubber torsion axle is substantially increased.

In some configurations, the second end of the spindle swing arm is configured to control movement of the spring so that the spring and the torsion axle shaft respond to dynamic forces in parallel.

Other configurations of the preferred embodiment can include other useful features and devices. For example, a frame mounting device can be entirely mounted under the vehicle frame. The frame mounting device can be attached to the bottom portion of a frame rail of a trailer. The rubber torsion axle assembly can pass through the frame mounting device. A spindle can be attached to the second end of the spindle swing arm. The spindle can have a spindle axis upon which a wheel rotates. The spindle axis can be above a bottom of the vehicle frame when the suspension assembly is in a no-load position. In other embodiments, the spindle can be below the bottom of the vehicle frame when the suspension is in or near a no-load position. The spring and the spindle can be located rearward of the torsion axle shaft pivot point. The spring can be any of a variety of springs; for example, the spring can be an air spring, a spring operated with a fluid, a mechanical spring or another type of spring.

The suspension assembly can be a first suspension assembly located on the left side of the vehicle frame. A second suspension assembly can be located on the right side of the vehicle that is opposite the left side of the vehicle. The first suspension assembly and the second suspension assembly are configured to operate independently of one another.

Using independent suspension assemblies in this way provides for equalization axle-to-axle from the front to the rear and can prevent overloading of the rubber suspension, tires, rims, spindles, etc. Independent suspension assemblies, along with separate side-to-side air controls, can keep the trailer (or vehicle) from leaning when loaded heavily on one side. The independent side-to-side suspension of this configuration allows use of rubber torsion axles in tri-axle configurations and provides for wider spacing of tandem axles if desired.

Another configuration of the preferred embodiment includes a suspension assembly with a support swing arm. This assembly includes an elongated central torsion axle shaft that is a rubber torsion axle assembly. The torsion axle shaft has a torsion axle shaft pivot point about which it pivots. A mounting device is used to mount the suspension assembly to a frame of a vehicle. An elongated spindle swing arm has a first end and a second end and the first end of the spindle swing arm is connected to the torsion axle shaft. The support swing arm has a first end and a second end and the first end of the support swing arm is mounted to the mounting device so that the support swing arm rotates about a support swing arm pivot axis. A link device has a first end and a second end. The first end of the link device is connected to the second end of the support swing arm and the second end of the link device is connected to the second end of the spindle swing arm. A spring is connected between the mounting bracket and the second end of the support swing arm.

In some configurations, the second end of the spindle swing arm controls the movement of the spring through the link device so that the spring reacts to dynamic loads in parallel with the rubber torsion axle assembly. Additionally, the spring can bias or place the elongated central torsion axle shaft into a predetermined position to offset static loads so that the elongated central torsion axle shaft has an optimized range of motion for encountering dynamic loads. As mentioned earlier, the predetermined position can be a no-load position.

When the rubber torsion axle assembly (including the elongated central torsion axle shaft and torsion axle shaft pivot point) are part of an existing trailer or vehicle, the mounting device, elongated spindle swing arm, spring, support swing arm and link device can be retrofitted to the trailer or vehicle and its rubber torsion axle assembly without the need of first removing the torsion axle from the frame of the vehicle.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE INVENTION

Figure 1:
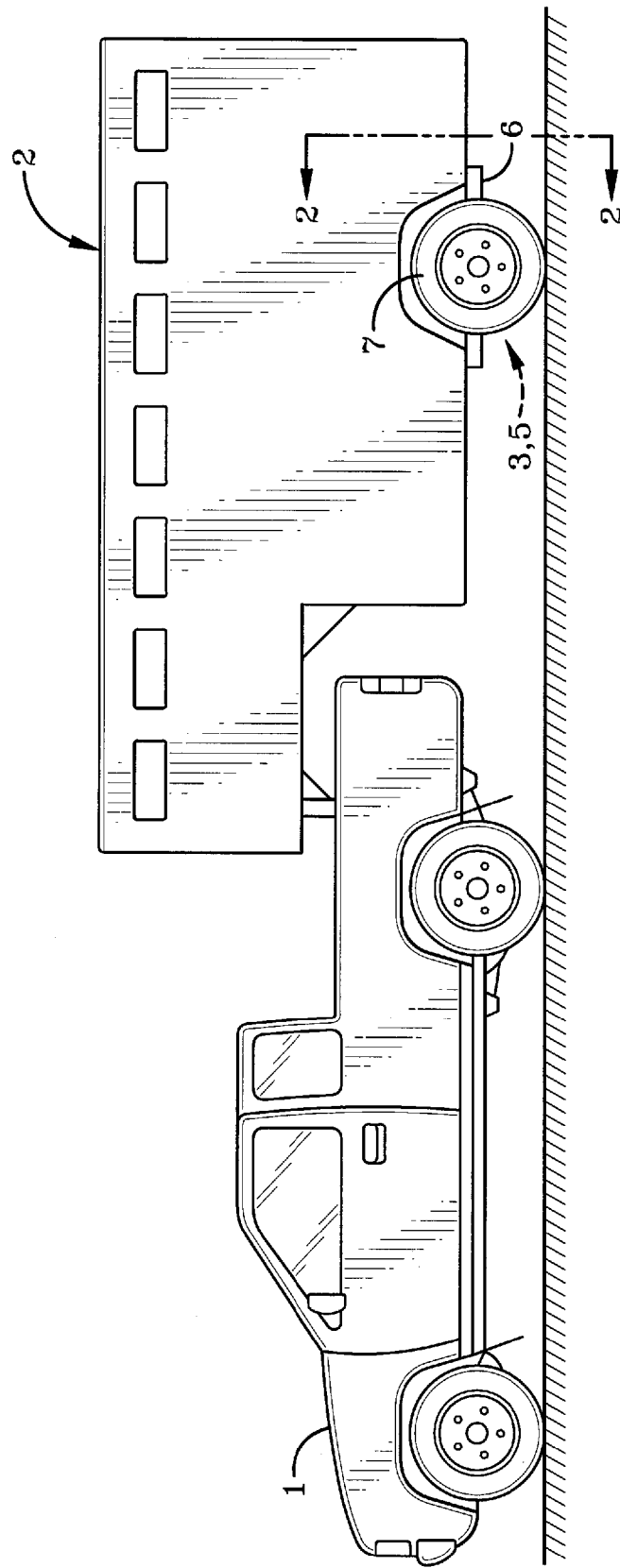
FIG. 1 is an example diagrammatic side elevational view of a truck and a trailer on which the improved suspension assembly is mounted.

FIG. 1 illustrates an example midsized trailer 2 that is pulled by a truck 1. The preferred embodiment of a vehicle suspension system indicated generally at 3 is mounted to the trailer 2 and is used to soften force encountered by its wheels 7. The suspension system 3 can be mounted to other trailers of different sizes and in some configurations might even be mounted directly to a truck 1 as FIG. 1 merely illustrates one example of where the suspension system 3 is used and does not limit other potential uses.

Figure 2:
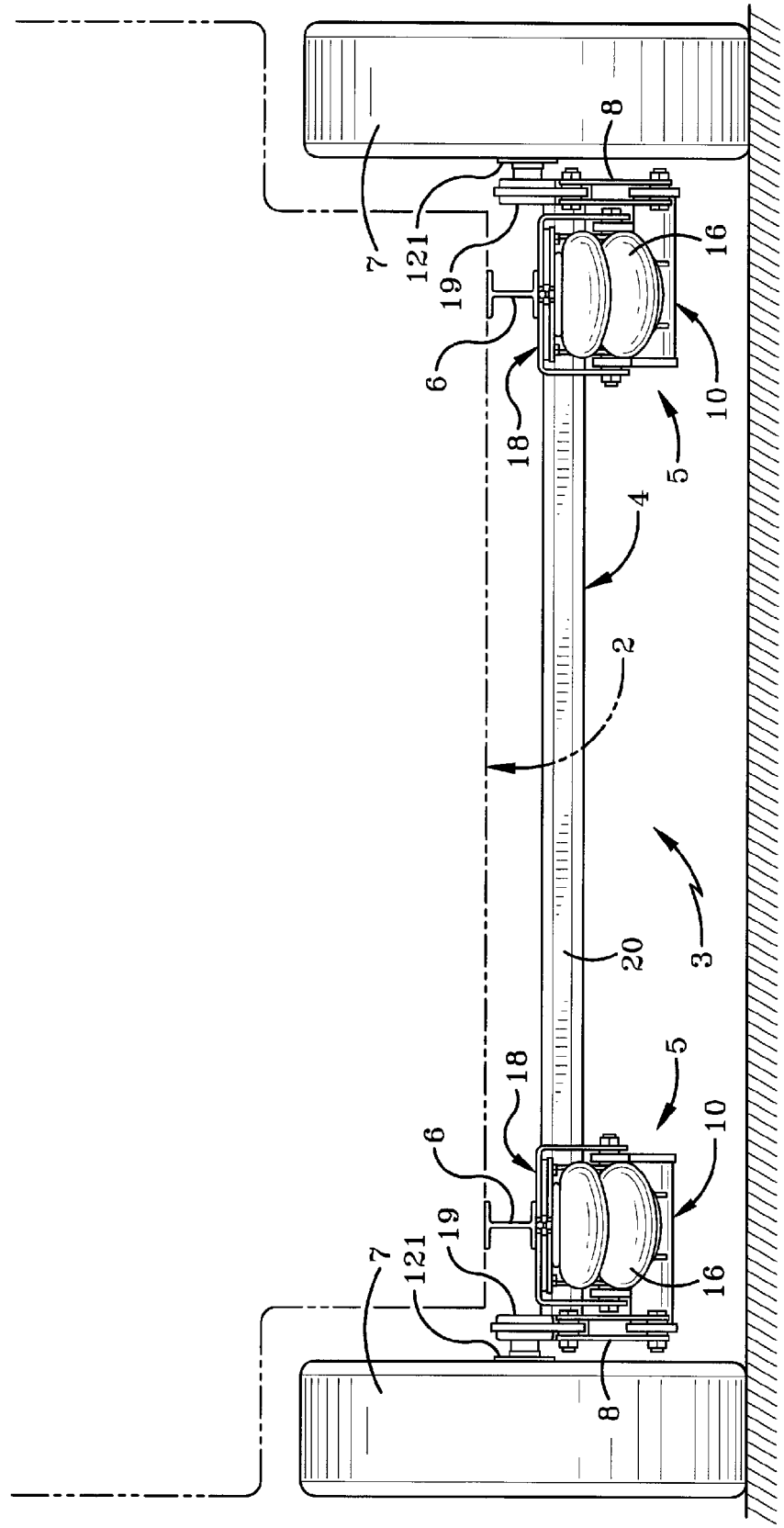
FIG. 2 is an example rear elevational view of a pair of the improved suspension assemblies mounted on a trailer shown in dot dashed lines.

As shown in FIG. 2, the trailer 2 includes a rubber torsion axle assembly 4 extending across the width of the trailer 2. In general, the rubber torsion axle assembly 4 can be mounted to the trailer 2 when the rest of suspension system 3 is mounted to the trailer 2 at the time of manufacture of trailer 2. However, as discussed later, each suspension assembly indicated generally at 5 can be later retrofitted to an existing trailer by mounting the suspension assembly 5 to an existing rubber torsion axle assembly 4. In other configurations, the suspension assembly can be mounted, at least partially, to the frame of a trailer. It is even conceivable that in some cases the combination of two suspension assemblies 5 and a rubber torsion axle assembly 4 can all be later retrofitted to a trailer.

Before describing the preferred embodiment of the suspension system 3 in detail, the following are briefly discussed: First, a paragraph introduces an improved new suspension assembly 5 with a link device 8. Secondly, a paragraph discusses the benefits of a suspension assembly with the link device 8. Third, a paragraph discusses a configuration of the suspension assembly that has the spindle swing arm attached to one end of a spring without requiring a support swing arm as used in the preferred embodiment before returning to a detailed discussion of the components of the preferred embodiment.

The preferred embodiment includes a link device 8 (best seen in FIG. 3) between a support swing arm 10 and a spindle. The link device 8 links the support swing arm 10 to the spindle swing arm 19 so that elastomeric strips or bars 14 in the torsion axle 4 operate simultaneously with an air spring 16. The link device 8 also allows the air spring to be inflated so that the spindle 12 can be placed at or near the no-load position (or another predetermined position) when the trailer 2 is in a static condition that is not experiencing jounce or rebound conditions. The spindle can have a spindle axis upon which a wheel rotates. The spindle axis can be above a bottom of the vehicle frame when the suspension assembly is in a no-load position. In other embodiments, the spindle can be below the bottom of the vehicle frame when the suspension is in or near a no-load position. In summary, the use of an auxiliary spring acting on the spindle swing arm 19 on each side of the rubber torsion axle assembly 4 can replace or relieve the force of the rubber torsion axle rubber springs 14 statically and can supplement the force of the rubber torsion springs 14 in reacting dynamic loads.

By linking the movement of the spring 16 to the spindle swing arm 19, the preferred embodiment creates an arrangement that produces substantially increased available axle/spindle travel, a softer ride and equalization in multi-axle applications. In the no-load position (or other predetermined position), the suspension assembly 5 can operate from the softest portion of the rubber suspension spring rate curved to provide the maximum dampening benefit of the torsion axle assembly 4. Operating from near the no-load position allows for a greater range of motion for the spindle 12 when jounce or rebound forces are encountered when the suspension assembly 5 encounters a hole or a protrusion that the suspension assembly is traveling over. Operating from near the no-load position (or other predetermined position) also increases the life of the rubber torsion axle 4 assembly by helping to prevent the overloading of the rubber in the rubber torsion axle assembly 4, tires, rims spindles and other components. Placing the central torsion axle shaft at or near a no-load position also relieves at least some of the bending loads the central torsion axle shaft is experiencing from the weight of the trailer because now, rather than having all of the bending loads received in the rubber torsion axle, the bending loads are also absorbed by the spring. The preferred embodiment of the suspension assembly 5 also provides for equalization from axle-to-axle that is independent from one side of the torsion axle assembly 4 to the other side of the rubber torsion axle assembly 4.

In the example preferred embodiment, the air spring 16 is illustrated as connected to the rubber torsion axle 4 through the spindle swing arm 19 and the link devices 8. The link device 8 in turn is shown as supported by the support swing arm 10 with a pivot axis of the support swing arm 10 located where it is attached to a mounting device. In other configurations, the support swing arm and the link device 8 can be eliminated and one end of the air spring 16 can be directly connected to an attachment point on the support swing arm 19. In other configurations, the air spring 16 can be replaced with other types of springs. For example, a mechanical spring could be used, a spring operating with a fluid can also be used, a different gas or another material could also be used in different configurations of the preferred embodiment. Even when some type of link device 8 is used, it can be any kind of link device and can be another device that is not necessarily solid/metal link devices. For example, in another configuration of the preferred embodiment, a cable could be attached between support swing arm 10 and spindle 12. Any other suitable device or method as understood by those of ordinary skill in the art could be used to link the spring to the spindle swing arm 19.

Figure 3:
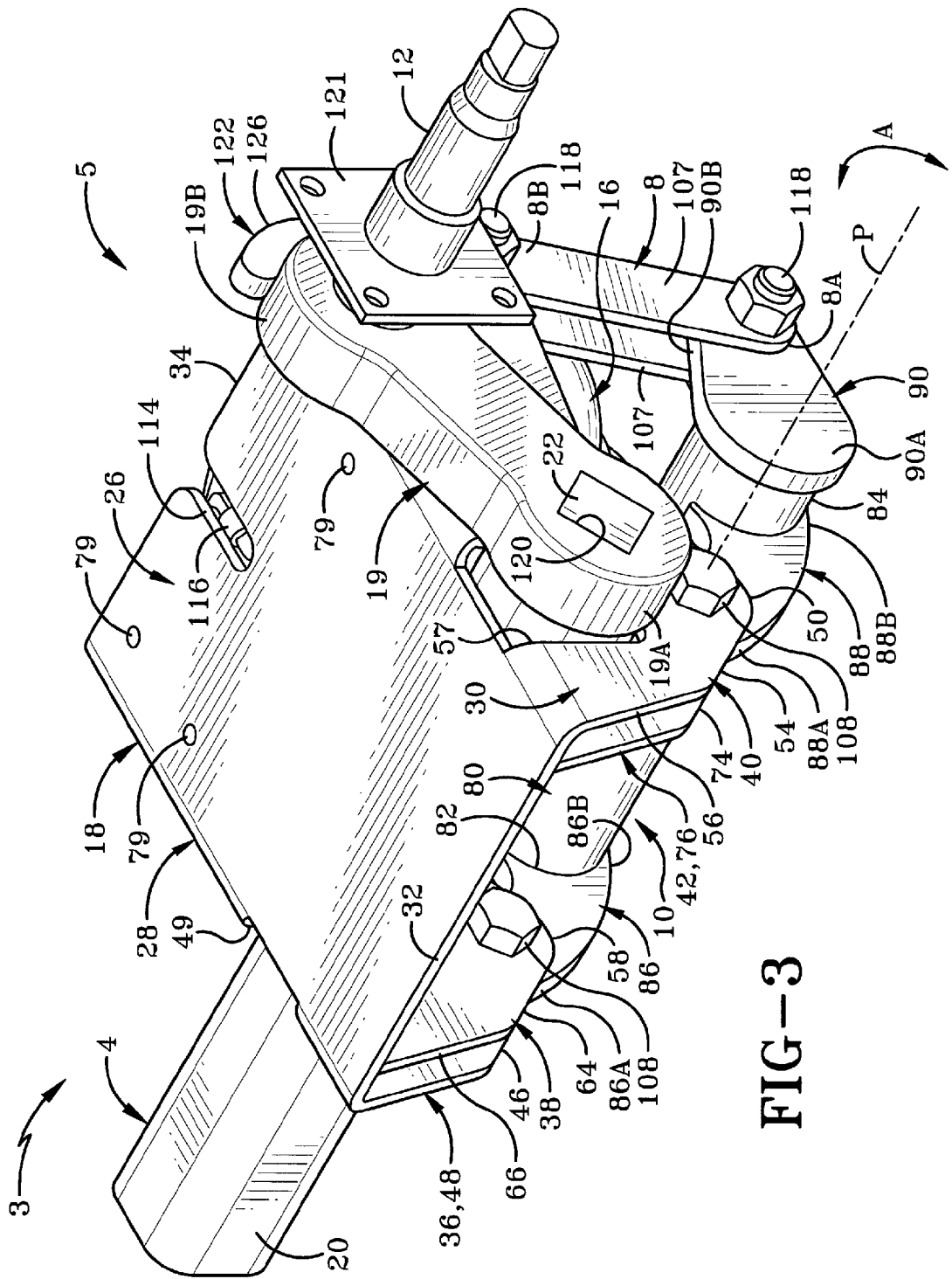
FIG. 3 is an example perspective view of the improved vehicle suspension assembly of the present invention.

Returning to a detailed description of the components of the preferred embodiment of the suspension assembly 5, it can be best seen in FIG. 3 that the major components of the suspension assembly 5 includes the link device 8, support swing arm 10, spindle 12, air spring 16, a mounting device 18 and a spindle swing arm 19. The mounting device 18 in the preferred embodiment is attached to the frame of the trailer 2 and/or an existing torsion axle 4 attached to the trailer 2. The rubber torsion axle assembly 4 extends between a pair of the improved suspension assemblies 5 as shown particularly in FIG. 2, and includes a generally square-shaped outer tube 20 and a central torsion axle shaft 22 at each end thereof. Each central torsion axle shaft 22 is movably rotatably mounted about a pivot axis within outer tube 20. The torsion axle assembly 4 includes plurality of torsion axle rubber springs 14 (FIG. 9) which are press-fitted within the hollow interior 24 of outer tube 20 and resiliently support the central torsion axle shaft 22 therein. Torsion axle 4 is similar to a well-known torsion axle, one type being sold under the trademark TOR FLEX® from Dexter Axle.

As best seen in FIG. 3, the mounting device 18 is formed with a top plate 26 that is rectangular in shape with a right side 28, left side 30, a front end 32 and a back end 34. The mounting device 18, as well as most other components of the preferred embodiment, is formed of a hard metal such as steel, however other metals and materials can be used. The right side 28 is formed with a right side outer wall 36 and a right side inner wall 38 that is generally parallel to the right side outer wall 36. The right side outer wall 36 and a right side inner wall 38 are each formed with respective cutouts 49, 67 for the torsion axle assembly 4 to pass through. The left side 30 is formed with a left side outer wall 40 and a left side inner wall 42 that is generally parallel to the left side outer wall 40. The left side outer wall 40 is of a similar shape to the right side outer wall 36 and the left side inner wall 42 is a similar shape to the right side inner wall 38. The left side outer wall 40 and a left side inner wall 42 are each formed with respective cutouts 57, 77 for the torsion axle assembly 4 to pass through.

The right side outer wall 36 is formed with a back edge 43 that is tapered from a lower end 44 upward to the back end 34 of the top plate 26. The right side outer wall 36 is also formed with a front 46 edge that is tapered from the lower end 44 upward toward a leading edge 48 that runs upward to the front end 32 of the top plate 26. The left side outer wall 40 is formed with a similar lower end 50, a back edge 52, a front edge 54 and a leading edge 56.

The right side inner wall 38 is formed with a lower end 58 that is complementary to the lower end 44 of the right side outer wall 36. The right side inner wall 38 is formed with a back edge 60 that tapers from the lower end 58 to rear edge 62 that more directly runs upward to the top plate 26 of the mounting device. In the preferred embodiment, the back edge 60 of the right side inner wall 38 runs generally parallel with a portion of the back edge 43 of the right side outer wall 36. The right side inner wall 38 is also formed with a front edge 64 that runs from the lower end 58 toward a leading edge 66 that more directly runs upward toward the front end 32 of the mounting device 18. The front edge 64 and the leading edge 66 are shaped similar to the front edge 46 and the leading 48 of the right side outer wall 36. The left side inner wall 42 has a lower end 68, a back edge 70, a rear edge 72, a front edge 74 and a leading edge 76 that are similar to the lower end 58, back edge 60, rear edge 62, front edge 64 and the leading edge 66 of the right side inner wall 38. The right side outer wall 36, right side inner wall 38, the left side outer wall 40 and a left side inner wall 42 are each formed with a hole 78 above and generally near their respective lower ends 44, 58, 50 and 68.

Figure 9:
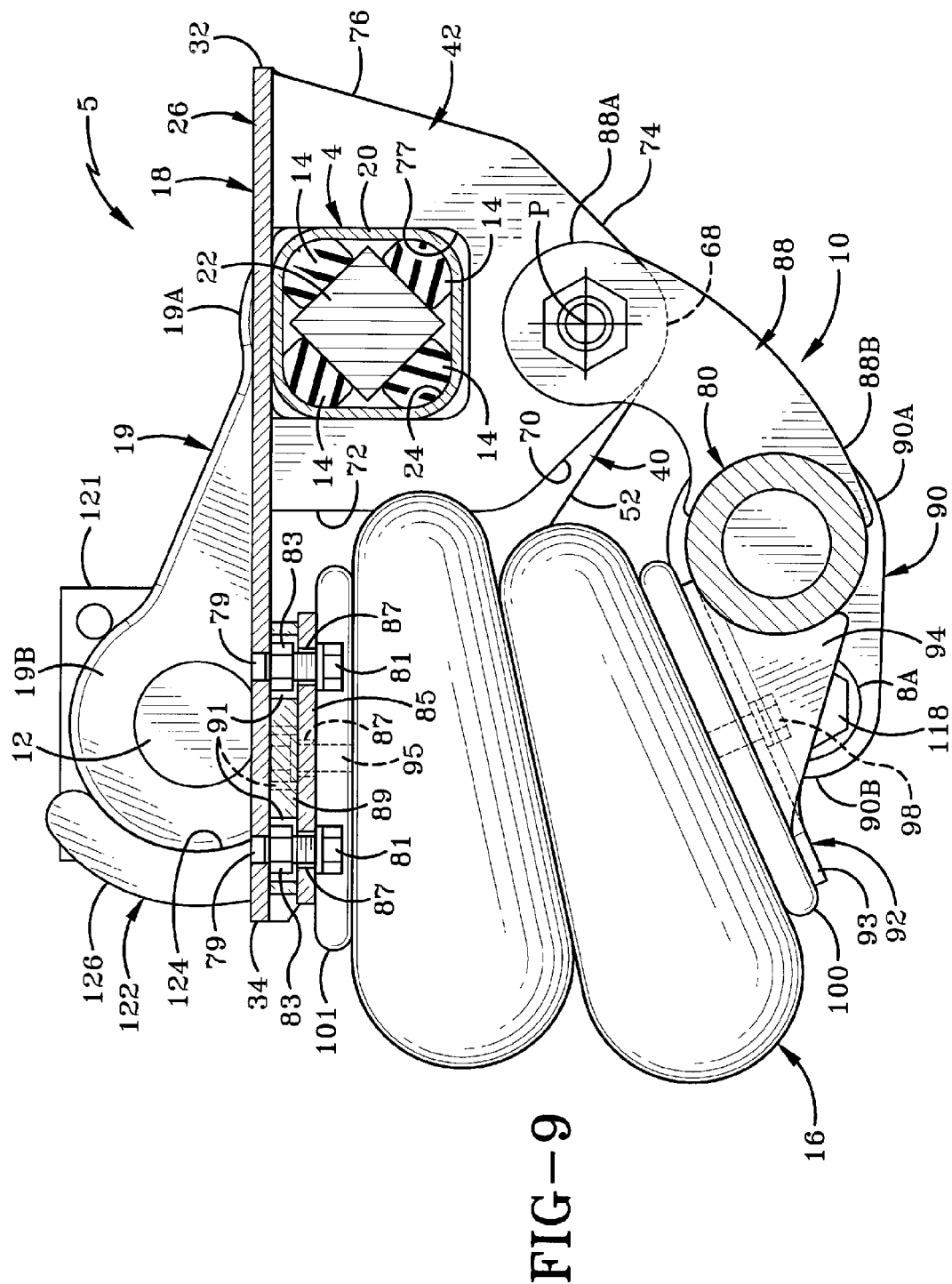
FIG. 9 is an example cross-sectional view of the improved suspension assembly with a link device.

As best seen in FIG. 9, the top plate 26 of the mounting device 18 can further include one or more holes 79. One or more nuts 83 can be welded to the underside of the top plate 26. A spacer bracket 89 with holes 91 in it is attached to the underside of the top plate 26 by one or more bolts 81 threaded into the nuts 83. One or more fastening devices such as bolts 95 can pass through the holes 91 and thread into an adapter plate 85 that is attached to an air spring top bracket 101. A notch 114 can be formed or cut into the top plate 26 to allow an air valve stem 116 to pass through the top plate 26 and an airline can later be connected to the air valve stem 116.

Figure 6:
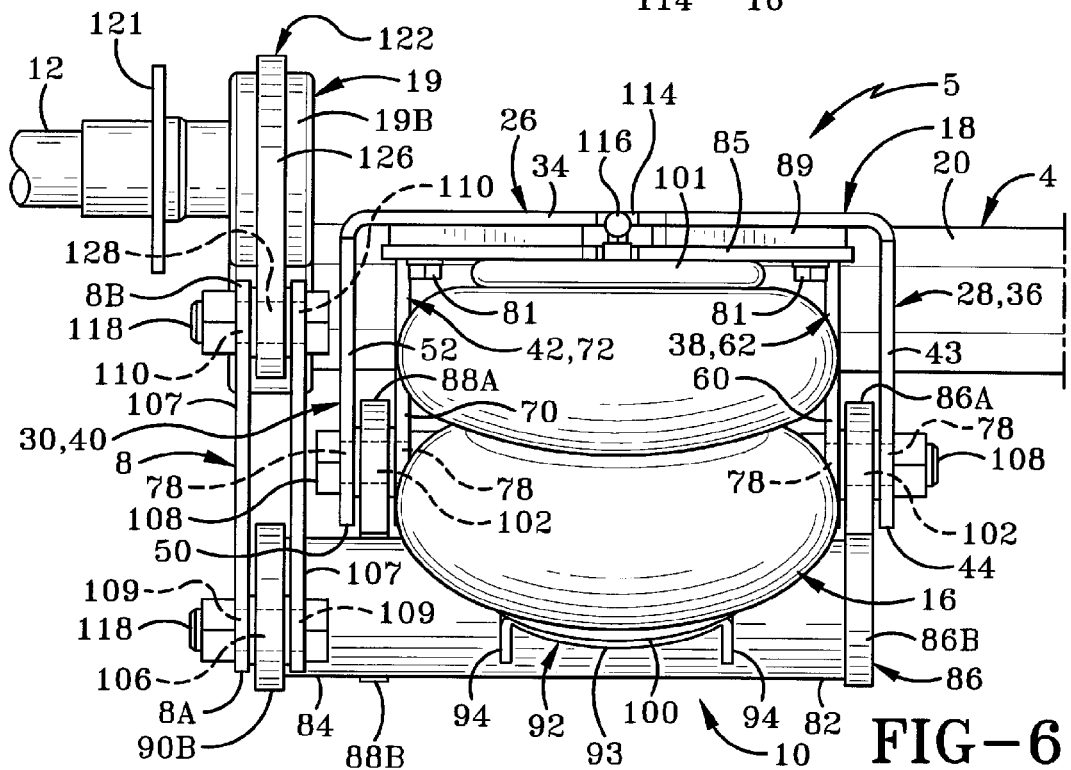
FIG. 6 is an example rear view of the improved vehicle suspension assembly with a link device.
Figure 7:
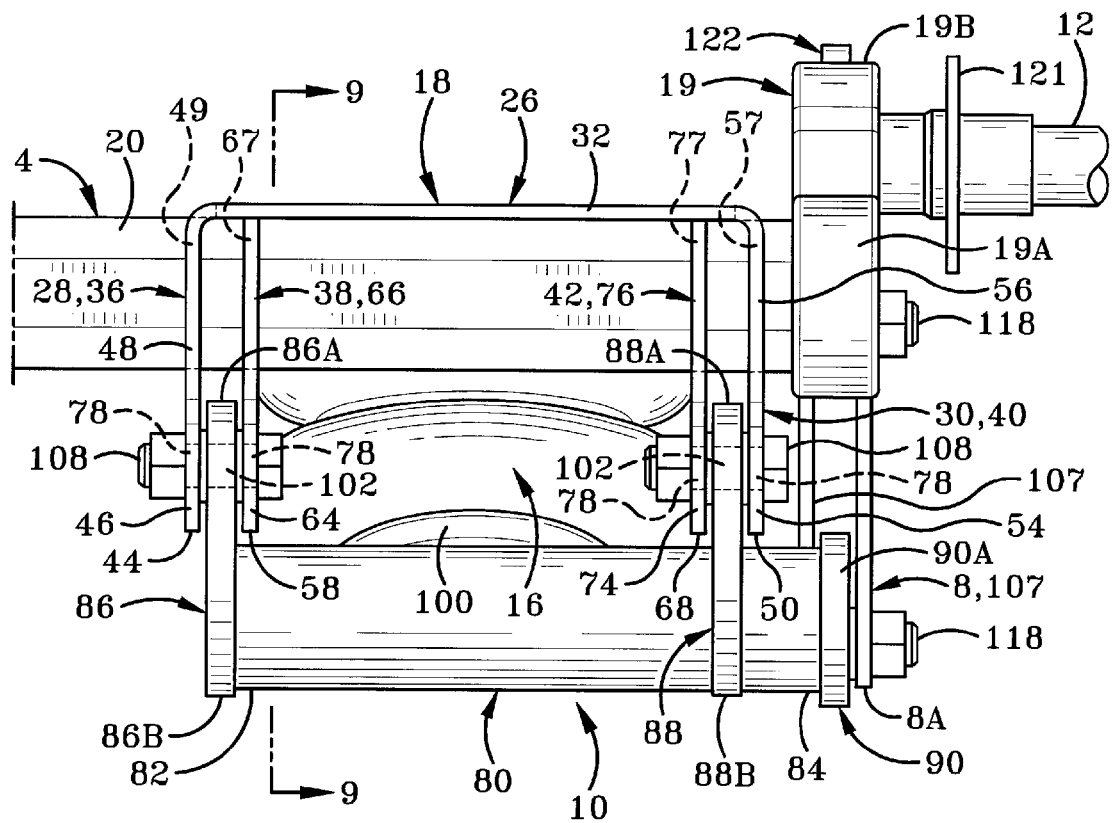
FIG. 7 is an example front view of the improved vehicle suspension assembly with a link device.

As best seen in FIG. 6, the support swing arm 10 includes a cross member 80 with a right end 82 and a left end 84. The support swing arm 10 also includes a right arm 86, a left arm 88, an air spring mounting platform 92 and a link plate 90 with a front end 90A and a back end 90B. The air spring mounting platform 92 is a plate of metal that is attached to the cross member 80 by welding it to the cross member 80. Of course, those with ordinary skill in the art will appreciate that the air spring mounting platform 92 can be formed with a top wall 93 and with two side flanges 94 bent down from the top wall 93. Alternatively, the two side flanges 94 can be formed out of different metal or other material and attached to the top wall 93 in different ways. The flanges 94 (90 degrees to the top wall 93) can provide more support to the air spring mounting platform 92. The air spring mounting platform 92 can include one or more holes 96 that can be used to mount the air spring 16 to the support swing arm 10. For example, one or more bolts 98 or other fasteners can be passed through the holes in the air spring mounting platform 92 and then threaded into or passed through an air spring bottom bracket 100 that is part of an air spring 16.

Figure 8:
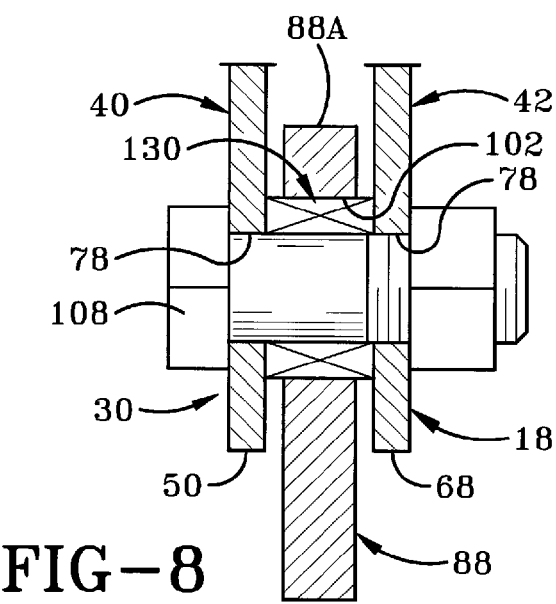
FIG. 8 is an example cross-sectional view of a pivot of the improved suspension assembly with a link device.

The right arm 86 and the left arm 88 of the support swing arm 10 can both be formed out of plates of metal curved in an upward direction as shown in the Figures. One end 86B of the right arm 86 can be connected to the right end 82 of the cross member 80 by welding or in another suitable way as understood by those with ordinary skill in the art. One end 88B of the left arm 88 can be connected near the left end 84 of the cross member 80 in a similar way. A hole 102 is located at the other ends 86A, 88A of the right arm 86 and the left arm 88. The support swing arm holes 102 can be aligned with the mounting device holes 78 and a bolt 108 or another similar type of mounting device can then be used to secure these devices together and allow the support swing arm 10 to pivot about a pivot axis "P" in the directions of arrow A (FIG. 3). Ball bearings 130 (FIG. 8) and/or bushings may also be located in one or both of holes 78, 102 to provide for a better pivot of the support swing arm 10 with respect to the mounting device 18.

In the preferred embodiment, the link 8 has a top end 8B and a bottom end 8A and is made of two elongated link members 107, the link plate 90 is formed out of a flat piece of metal and is attached to the left end 84 of the cross member 80 of the support swing arm 10. The link plate 90 has a reward protrusion with a hole 106 cut or formed into that protrusion. In the preferred embodiment, the link devices 8 are elongated pieces of metal with first and second ends. Holes 109 are formed or cut in the first end 8A of the link devices and holes 110 are formed or cut in the second end 8B of the link devices 8. A bolt 118 or another suitable fastening device can be passed through the holes 106 in the link plate 90 and holes 109 in the first ends of the link devices 8 to connect the first ends of the link devices 8 to the support swing arm 10. Note that the link devices 8 are primarily to hold the support swing arm 10 at an angle that is generally proportional to the location of the spindle 12. If the pivot point of the swing arm 10 and spindle 12 were the same and the lengths of their attachment points from this pivot to each end of the links 8, then the link devices 8 would cause the support swing arm 10 and the spindle swing arm 19 to rotate with the same angle when a force on the torsion axle 4 is encountered.

The spindle 12 is attached to one end 19A of the spindle swing arm 19 and the other end 19B of the spindle swing arm 19 is rigidly attached to the other end of the central torsion axle shaft 22. For example, one end of the central torsion axle shaft 22 can fit into a square opening 120 in the spindle swing arm 19 and rigidly attached at that location. A brake assembly mounting plate 121 is secured to spindle 12 for subsequent attachment to a brake assembly and the spindle 12 supports a wheel/hub assembly in a manner well known in the art.

Figure 4:
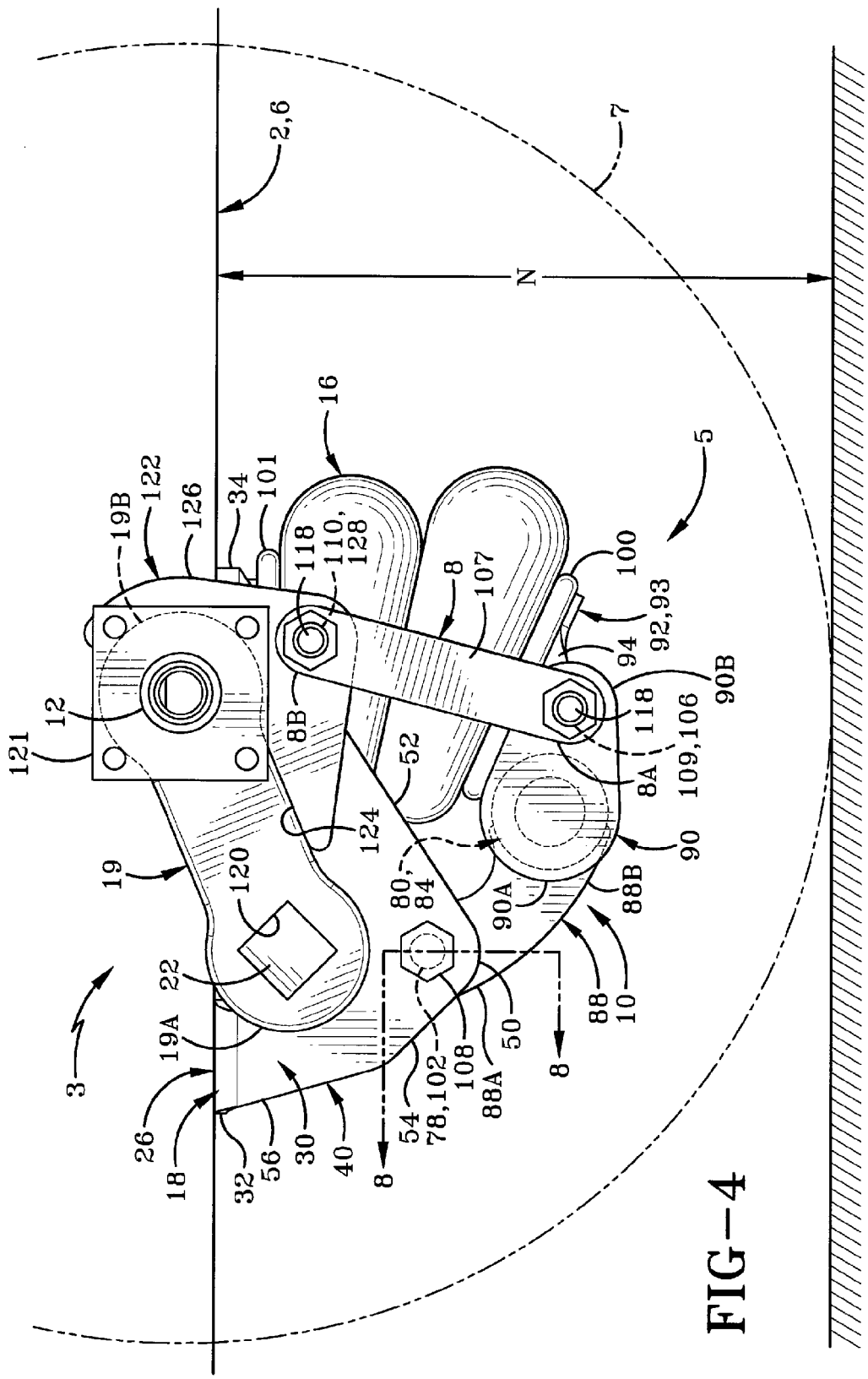
FIG. 4 is an example view of the improved vehicle suspension assembly in a nearly design position.
Figure 5:
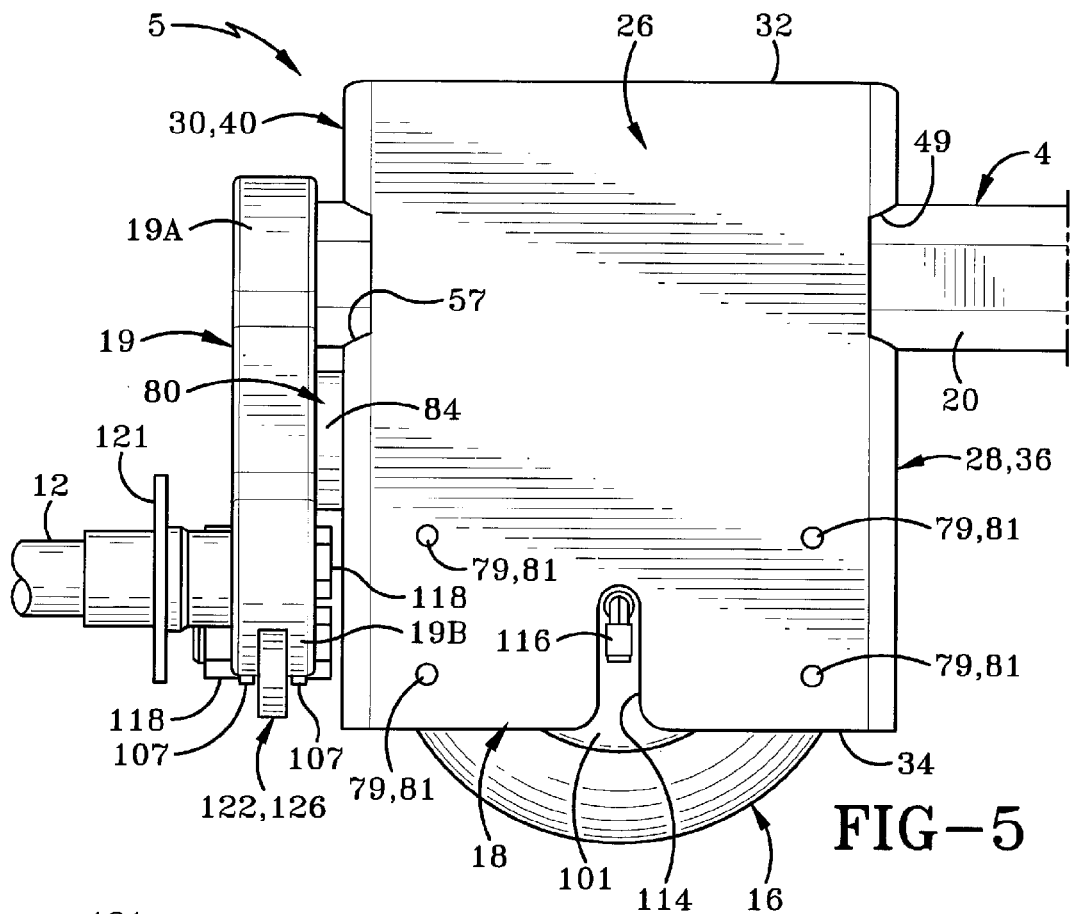
FIG. 5 is an example top view of the improved vehicle suspension assembly with a link device.

The spindle swing arm 19 includes a spindle link attachment plate 122. In the preferred embodiment, the spindle link attachment plate 122 is formed out of a sheet of metal and has an interior edge 124 that is shaped complementary to a portion of the surface of the spindle swing arm 19 as best seen in FIG. 4 and has an outer edge 126. Of course, the spindle link attachment plate 122 can be made out of other materials and be shaped differently than what is illustrated. The interior edge 124 should be of sufficient length so that when the spindle link attachment plate 122 is attached to the spindle swing arm 19 at the interior edge 124 there is sufficient bonding between the two so that they are one rigid device that is not easily separated during normal operation of the trailer 2. The shape and distance, and thus, the amount of material, between the interior edge 124 and outer edge 126 should be sufficient so that a hole 128 can be formed in the spindle link attachment plate 122 and the spindle link attachment plate 122 will not fail while in operation on the trailer 2. A bolt or another connector device is passed through the hole 128 in the spindle link attachment plate 122 and the holes 110 in the link device 8 to link rotation of the central stub shaft 22 in the torsion axle 4 to movement in the spindle swing arm 19 and thus the amount of compression (or decompression) of the air spring 16.

Figure 10:
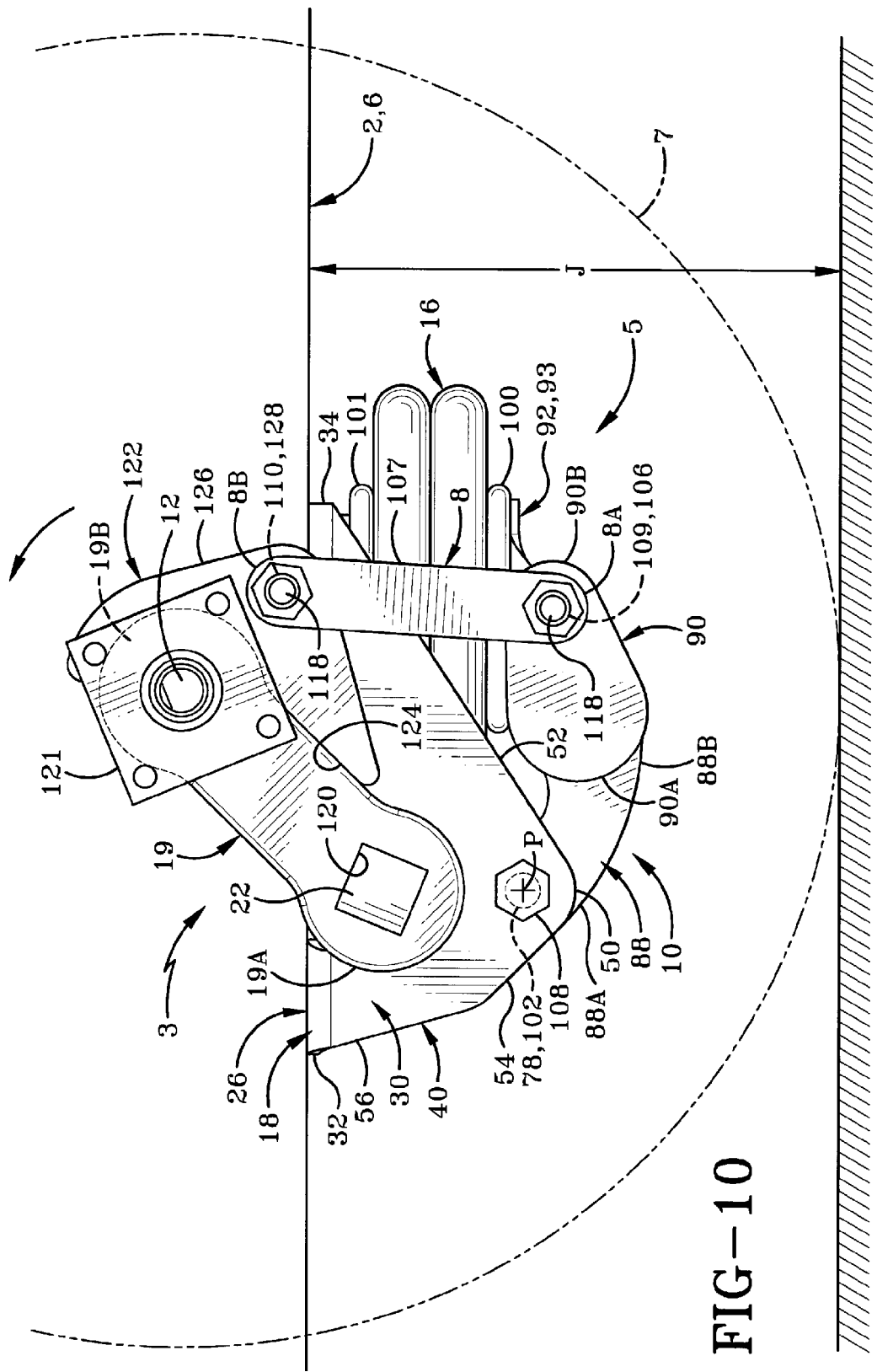
FIG. 10 is an example view of the improved vehicle suspension assembly in a nearly full jounce position.
Figure 11:
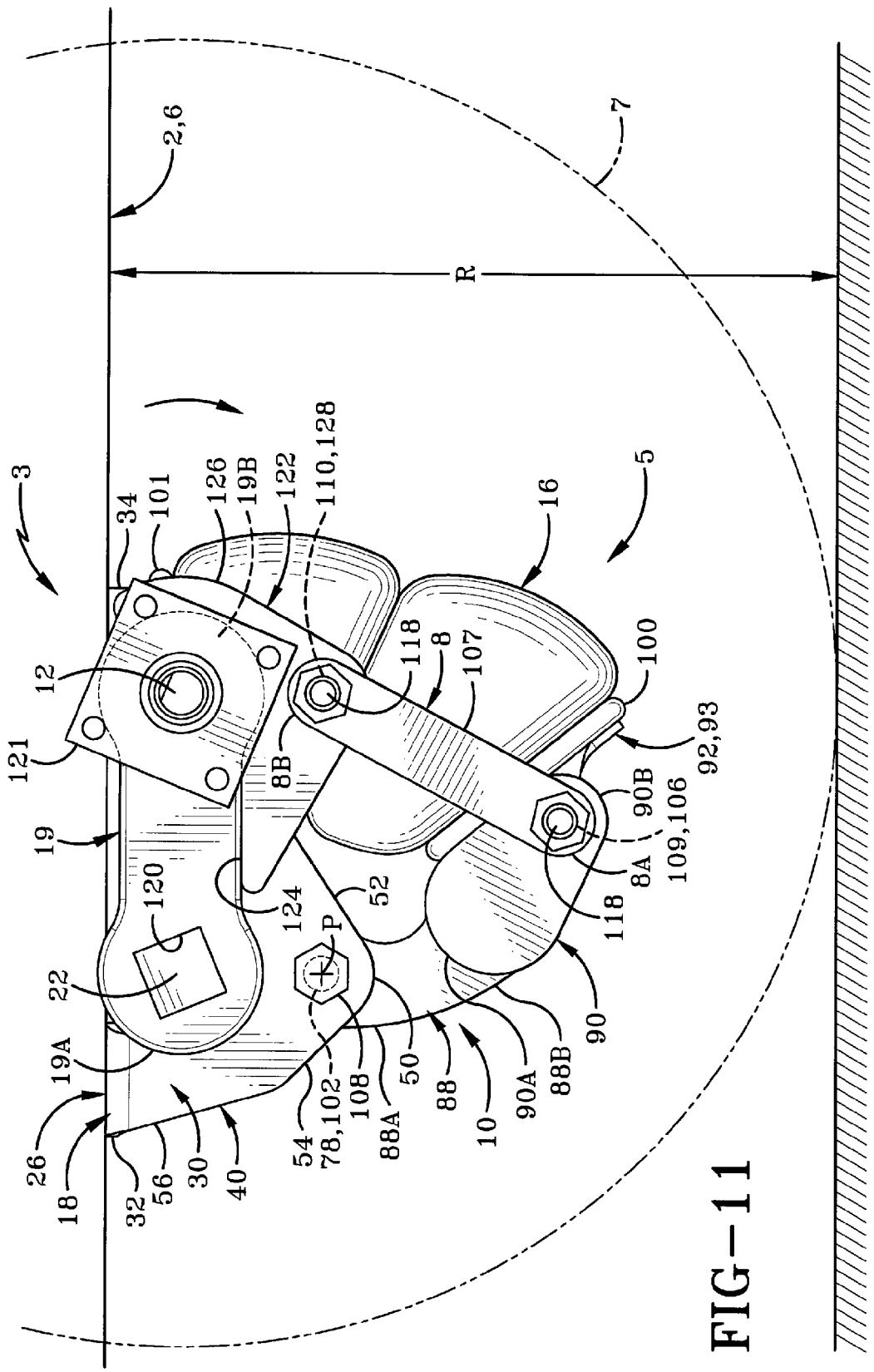
FIG. 11 is an example view of the improved vehicle suspension assembly in a nearly full rebound position.

Having described the various components of the preferred embodiment of the suspension assembly 5, its operation and use will now be described. FIGS. 4, 10 and 11 show example operation positions of the suspension assembly 5. FIG. 4 shows the position of the suspension assembly near the no-load position when there are no dynamic forces acting on it and the air spring 16 has moved the central torsion axle shaft 22 back to or near its unloaded position so the effect of the weight of the trailer acting on the torsion axle shaft 22 has been removed. In this Figure, the separation of the bottom of the trailer from the ground is represented by distance N and the central axis of the spindle 12 is above the bottom of rail 6 of trailer 2. FIG. 10 shows both the suspension assembly 5 in a nearly full jounce position as shown by the counterclockwise pivotal movement of spindle swing arm 19 in the direction of the arrow and the rotational movement of central torsion axle shaft 22 is in the same direction. In this Figure, the separation of the bottom of the trailer from the ground is represented by distance J that is less than the distance N in FIG. 4 while the axis of the spindle 12 is further above the bottom rail 6 of the trailer 2. FIG. 11 shows a nearly full rebound position where both central torsion axle shaft 22 and its associated torsion axle rubber springs 14 and spring 16 provide the desired stability to the suspension assembly by absorbing the various twisting and up and down or side-to-side movement exerted on the trailer wheels 7. In this Figure, the separation of the bottom of the trailer from the ground is represented by distance R that is greater than the distance N in FIG. 4 while the axis of the spindle 12 is now below the bottom rail 6 of the trailer 2.

The preferred embodiment of the suspension assembly 5 (FIGS. 1-11) is an original equipment manufacturer (OEM) suspension assembly 5. This version can be built by a rubber torsion manufacturer OEM and then sold with the rubber torsion axle to the trailer manufacturer. In one configuration, the rubber torsion manufacturer OEM may assemble all or part of the suspension assembly 5 as it is installed on a trailer. In other configurations, the suspension assembly 5 can arrive at the rubber torsion manufacturer OEM partially pre-assembled or fully assembled before it is to be installed on the torsion axle. In this case, the rubber torsion manufacturer OEM will install a pair of suspension assemblies 5 onto a torsion axle before it is sold to a trailer manufacturer who will install this combination onto a trailer. Alternatively, one or more rubber torsion manufacturer OEMs can license the preferred embodiment from the inventor(s) and produce their own components and assemble them when manufacturing axles. Ideally, the rubber torsion manufacturer OEM can sell the completed assembly to the trailer manufacturer who will install the suspension assemblies 5 to the trailer with bolts and/or welds preferably by bolting and/or welding the mounting devices to frame rails of the trailer.

Figure 12:
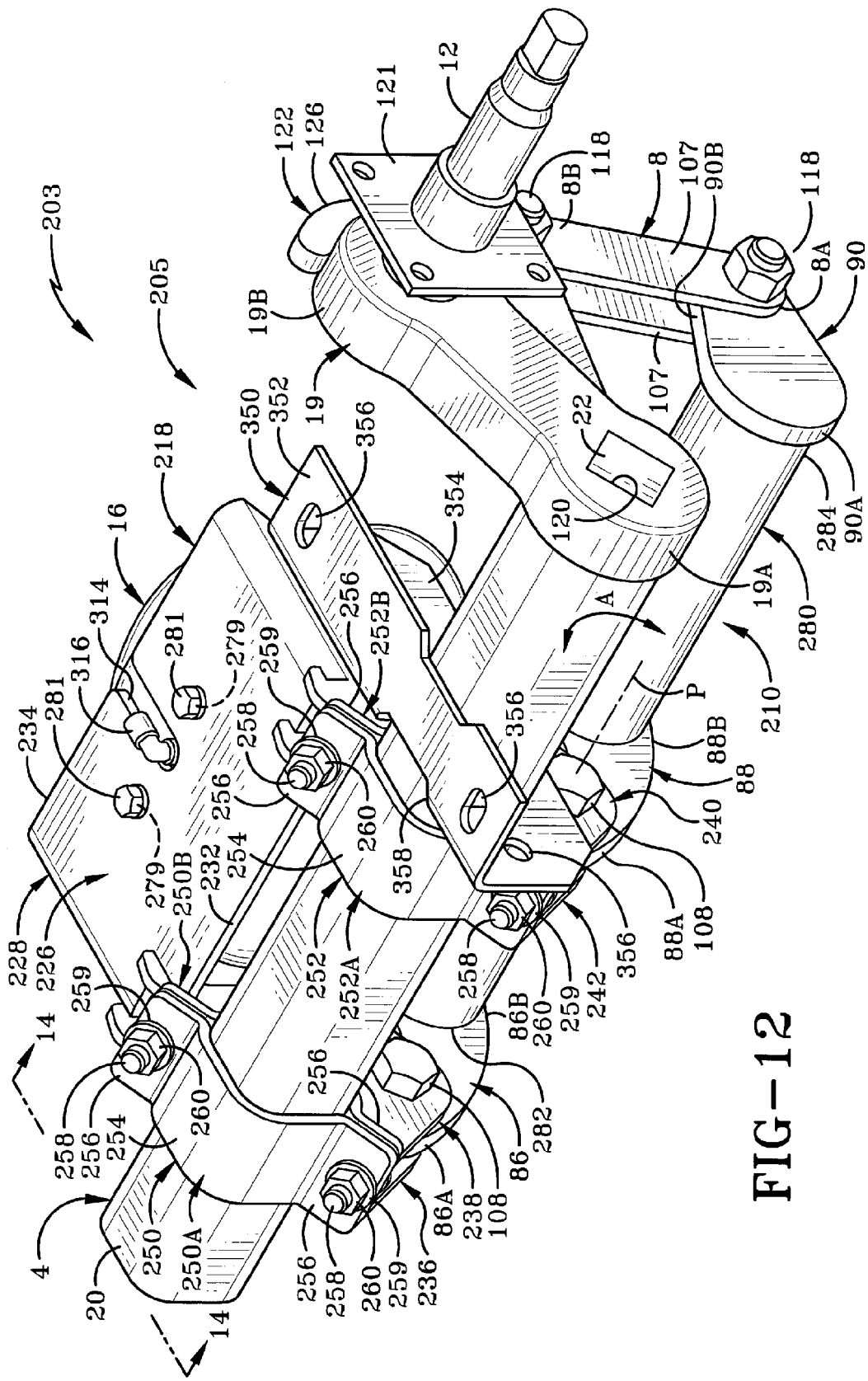
FIG. 12 is an example perspective view of the improved vehicle suspension assembly in a retrofit configuration.
Figure 13:
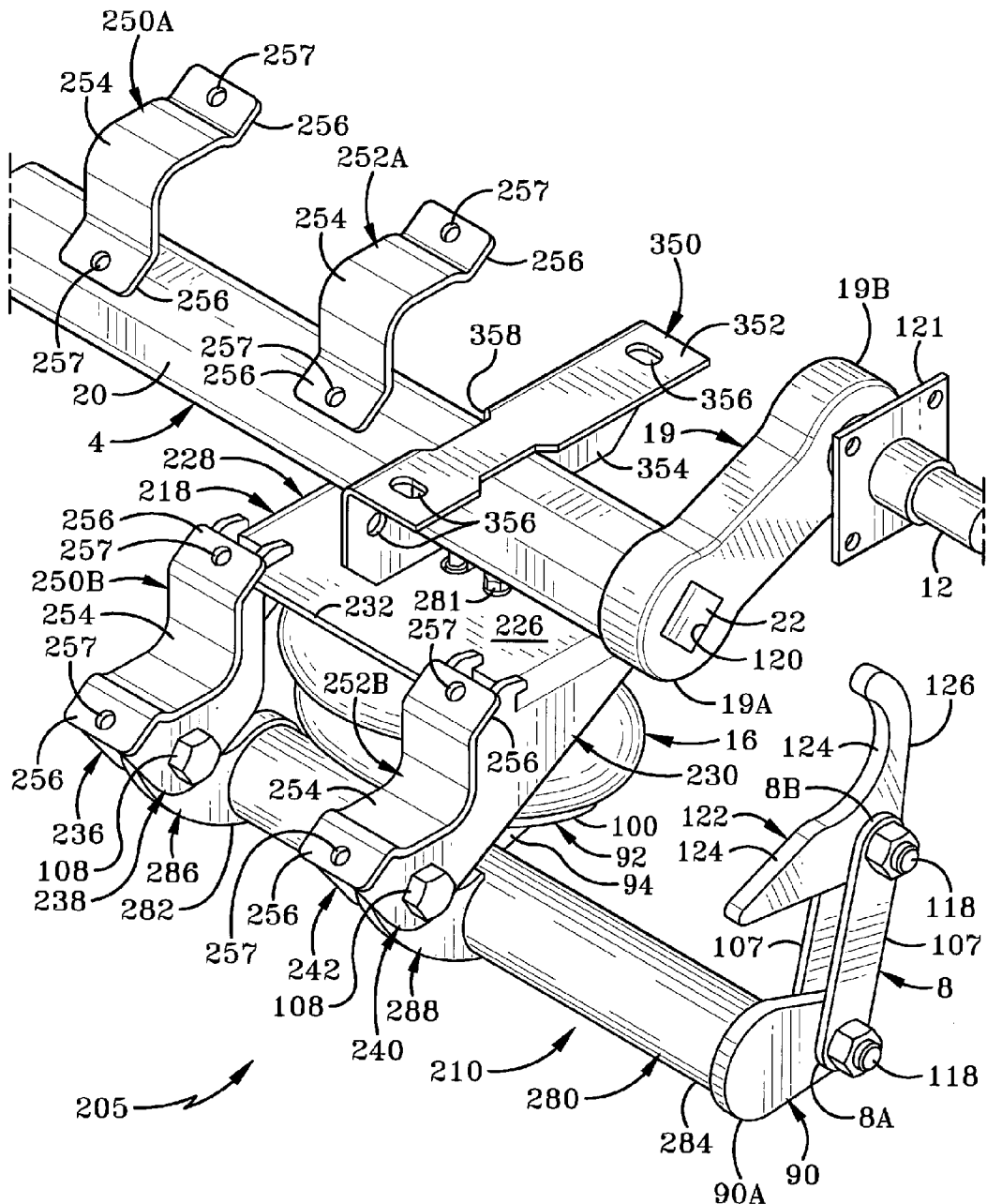
FIG. 13 is an example exploded perspective view of the improved vehicle suspension assembly in the retrofit configuration.
Figure 14:
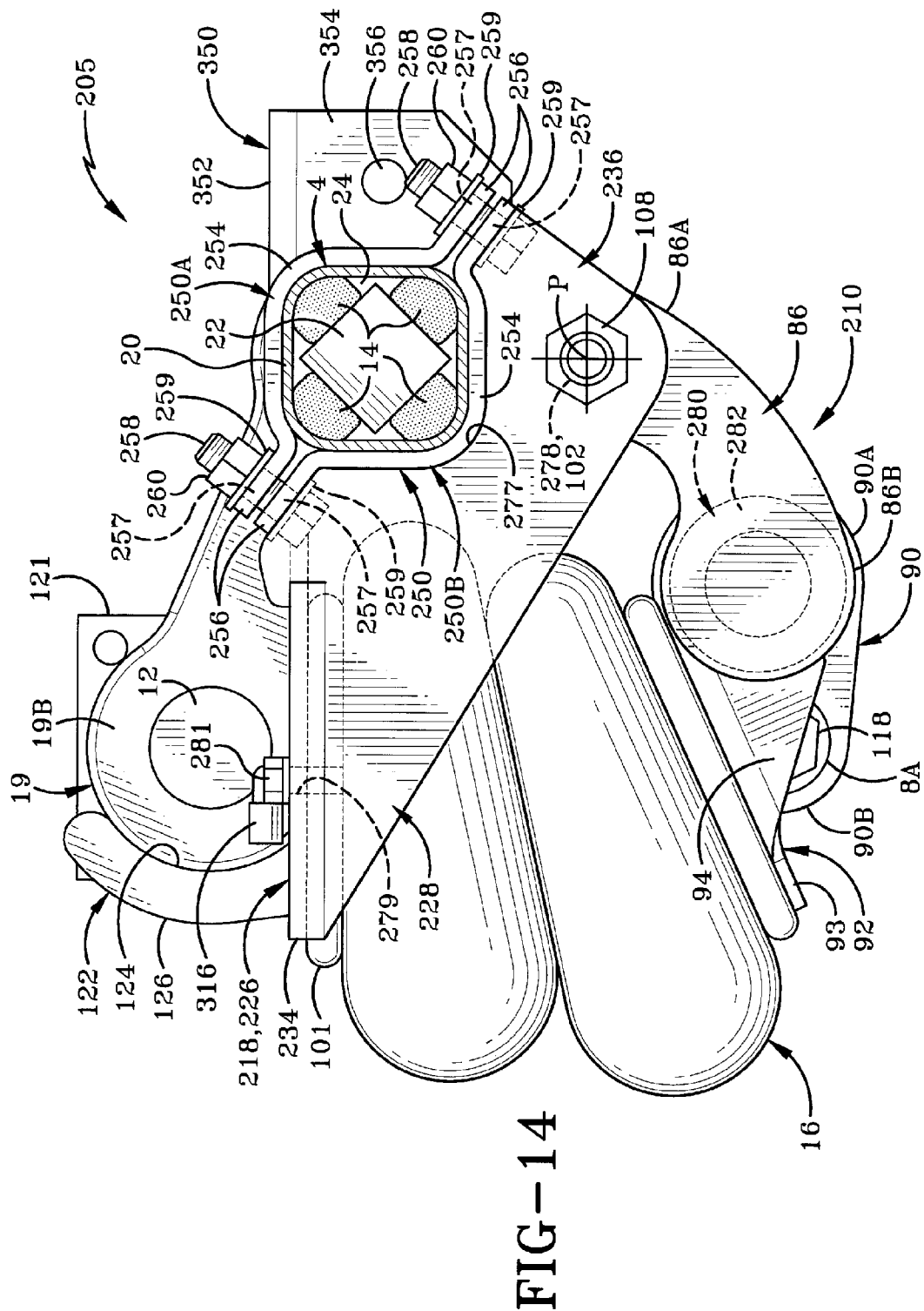
FIG. 14 is an example cross-sectional view of the improved vehicle suspension assembly in the retrofit configuration.

Alternatively, the suspension assembly 5 can be retrofitted to trailers that have already been produced and may have already been in use. As best seen in FIGS. 12-14, these configurations of the preferred embodiment include custom made clamp devices 250, 252 or other devices that are used to clamp/fasten the retrofit suspension assembly 205 to the torsion axle 4 of an existing trailer. Other attachment devices could be used as understood by those of ordinary skill in the art. Configurations of the preferred embodiment that are retrofitted to trailers and their torsion axles also include a spindle link attachment plate 122 that can be similar to the OEM spindle link attachment plate 122 discussed above. The spindle link attachment plate 122 can be welded to the spindle swing arm 19 or attached/clamped to the spindle swing arm 19 in other ways as understood by those of ordinary skill in the art. Next, link devices 136 are connected between the spindle link attachment plate 122 and the support swing arm 210.

In other configurations of the preferred embodiment, the rubber torsion axle tube 20 may need to be slid onto the mounting device 218 before the retrofit suspension assembly 205/suspension system 203 is mounted to the trailer 2. In other embodiments, other components may need to be assembled by the OEM as the retrofit suspension system 203 is assembled onto the trailer 2. The retrofit suspension assembly 205 includes a support swing arm 210 with a longer cross member and shorter arms 286, 288 than the support swing arm 10 discussed above. Otherwise, the components of the retrofit support swing arm 210 can be components similar to the support swing arm 10 of the preferred embodiment discussed above.

The torsion axle can be already mounted to a rail bracket 350 that is attached to the trailer 2. The bracket 350 can include a top plate 350, a vertical wall 354 and one or more mounting holes 256 used to mount the bracket 350 to a trailer.

The retrofit suspension assembly 205 includes a frame mounting device 218 with a top wall 226, a right side 228, a left side 230, a front end 232, a back end 234 and holes 279. A notch is formed in the top wall 226 to provide an opening for a nozzle 316. One or more fastening devices 281 can be used to fasten an air spring top bracket 101 to the top wall 226 of the retrofit mounting device 218. Similar to the mounting device 18 discussed earlier, the retrofit mounting device 218 can have a similar right side outer wall 236, right side inner wall 238, a left side outer wall 240 and a left side inner wall 242. These walls support the clamp devices 250, 252.

Each of the clamp devices 250, 252 has a bottom clamp portion 250B, 252B attached to walls 236, 238 and walls 240, 242 respectively. Each bottom clamp portion 250B, 252B is formed with a generally curved wall 254 with flanges 256 at each of the generally curved wall 254 and a hole 257 through the flanges 256. The clamp devices 250, 252 also have top clamp portions 250A, 252A respectively that can be formed similar to bottom clamp portions 250B, 252B.

When installing the retrofit suspension assembly 205 to a trailer, the spindle link attachment plate will need to be welded to the spindle swing arm 19 or attached in another way as understood by those of ordinary skill in the art. The frame mounting bracket 218 can be mounted to the torsion axle assembly 4 by attaching the clamp devices 250, 252 around the torsion axle assembly 4 and to each other. This can be done by bolting the top clamp portions 250A, 252A to the bottom clamp portions 250B, 252B using washers 279, bolts 258 and nuts 260 as shown in FIG. 12.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 15:
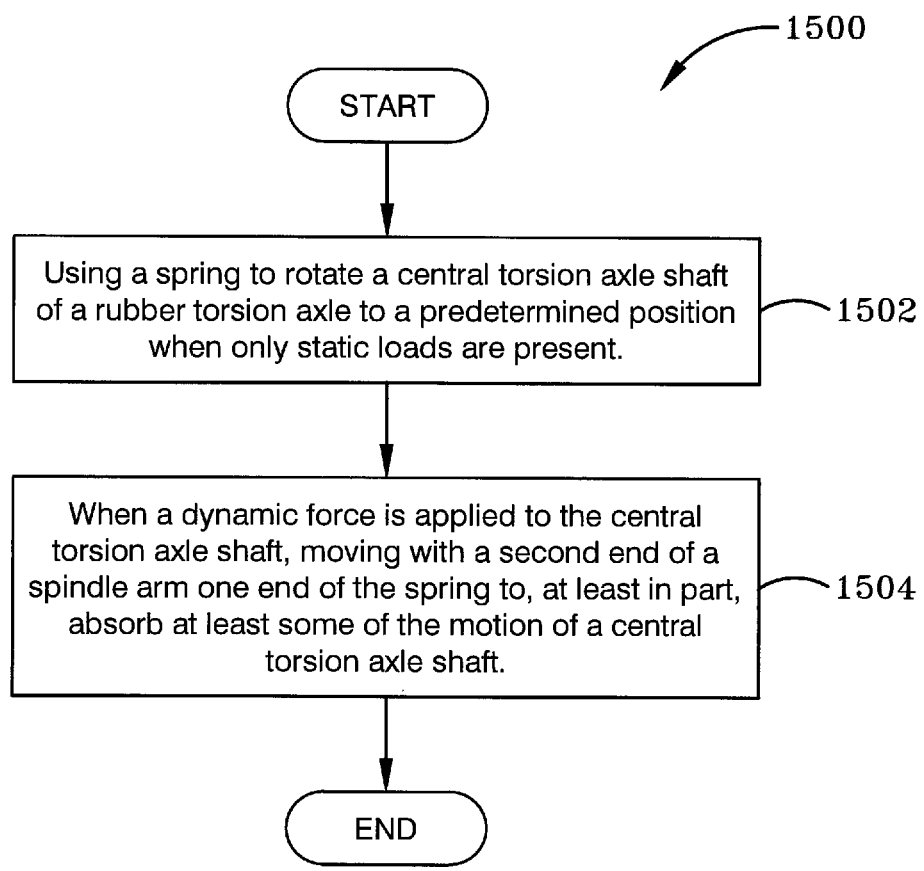
FIG. 15 is an example configuration of the preferred embodiment configured as a method.

FIG. 15 illustrates a method 1500 of reacting to loads encountered by a vehicle. The method 1500 begins by using a spring to rotate a central torsion axle shaft of a rubber torsion axle to a predetermined position, at 1502, when only static loads are present. As discussed earlier, the central torsion axle shaft can be connected to the first end of an elongated spindle swing arm that has a first end and a second end. The second end of the spindle swing arm (or another part of the spindle swing arm) can be connected to one end of the spring. In some embodiments, the spring can be an air spring. The predetermined position can be at or near a no-load position. By placing the central torsion axle shaft at or near a no-load position, static force can be removed from the central torsion axle shaft so that it can operate with a greater range of motion and provide for a better riding suspension system. Removing static loads from a torsion axle system also can greatly extend its lifespan. Placing the central torsion axle shaft at or near a no-load position also relieves at least some of the bending loads the central torsion axle shaft is experiencing from the weight of the trailer because now rather than have all of the bending loads received in the rubber torsion axle, the bending loads are also absorbed by the spring.

When a dynamic force is applied to the central torsion axle shaft, the method 1500 can also include moving with the second end of the spindle swing arm one end of the spring to, at least in part, absorb/dissipate at least some of the force/movement of the spindle arm, at 1504. Because the spring is connected to the spindle swing arm, the method 1500 reacts to dynamic loads with the spring and the central torsion axle shaft reacting in parallel.

In the foregoing description, certain terms have been used for brevity, clearness, and understanding. No unnecessary limitations are to be implied therefrom beyond the requirement of the prior art because such terms are used for descriptive purposes and are intended to be broadly construed.

Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A suspension assembly for a vehicle comprising:
    an elongated central torsion axle shaft of a rubber torsion axle assembly;
    a torsion axle shaft pivot point about which the torsion axle shaft is configured to pivot;
    a spring with a first end and a second end, wherein the first end of the spring is connected to a fixed point relative to a vehicle frame;
an elongated spindle swing arm with a first end and a second end, wherein the first end of the spindle swing arm is configured to be connected to the torsion axle shaft and wherein the second end of the spindle swing arm is connected to the second end of the spring; and
    a frame mounting device configured to be entirely mounted under the vehicle frame, wherein the rubber torsion axle assembly is configured to pass through the frame mounting device.

2. The suspension assembly for a vehicle of claim 1 wherein the spring is configured to set the torsion axle shaft to a static predetermined position so that there are no forces rotating the torsion axle shaft about the torsion axle shaft pivot point when no dynamic forces are being encountered.

3. The suspension assembly for a vehicle of claim 2 wherein the predetermined position is at a no-load position of the torsion axle shaft.

4. The suspension assembly for a vehicle of claim 3 wherein the rubber torsion axle assembly further comprises:
    an outer tube;
    rubber torsion springs located in the outer tube between the torsion axle shaft and the outer tube, wherein the no-load position relieves the rubber torsion springs of static force from vertical wheel loads and supplements the force of the rubber torsion springs in reacting dynamic loads.

5. The suspension assembly for a vehicle of claim 1 wherein the second end of the spindle swing arm is configured to control movement of the spring so that the spring and the torsion axle shaft respond to dynamic forces in parallel.

6. The suspension assembly for a vehicle of claim 1 wherein the spring and the spindle are located rearward of the torsion axle shaft pivot point.

7. The suspension assembly for a vehicle of claim 1 wherein the spring is an air spring.

8. The suspension assembly for a vehicle of claim 7 wherein the first end and the second end of the spindle swing arm are configured to react to loads.

9. The suspension assembly for a vehicle of claim 1 wherein the second end of the spindle swing arm is located at least partially under the spring.

10. The suspension assembly for a vehicle of claim 1 wherein the suspension assembly is a first suspension assembly located on a first side of the vehicle frame and further comprising;
    a second suspension assembly that is located on a second side of the vehicle that is opposite the first side of the vehicle, wherein the first suspension assembly and the second suspension assembly are configured to operate independently of each other.

11. A suspension assembly for a vehicle comprising:
    an elongated central torsion axle shaft of a rubber torsion axle assembly;
    a torsion axle shaft pivot point about which the torsion axle shaft is configured to pivot;
    a spring with a first end and a second end, wherein the first end of the spring is connected to a fixed point relative to a vehicle frame;
    an elongated spindle swing arm with a first end and a second end, wherein the first end of the spindle swing arm is configured to be connected to the torsion axle shaft and wherein the second end of the spindle swing arm is connected to the second end of the spring; and
    a spindle attached to the second end of the spindle swing arm with a spindle axis upon which a wheel is configured to rotate, wherein the spindle axis is above a bottom of the vehicle frame when the suspension assembly is in a no-load position.

12. A suspension assembly for a vehicle comprising:
    an elongated central torsion axle shaft of a rubber torsion axle assembly;
    a torsion axle shaft pivot point about which the torsion axle shaft is configured to pivot;
    a spring with a first end and a second end, wherein the first end of the spring is connected to a fixed point relative to a vehicle frame;
    an elongated spindle swing arm with a first end and a second end, wherein the first end of the spindle swing arm is configured to be connected to the torsion axle shaft and wherein the second end of the spindle swing arm is connected to the second end of the spring;
    wherein the spring is an air spring; and
    wherein the torsion axle shaft pivot point is beneath the air spring.

13. A suspension assembly comprising:
    an elongated central torsion axle shaft of a rubber torsion axle assembly;
    a torsion axle shaft pivot point about which the torsion axle shaft is configured to pivot;
    a mounting device for mounting to a frame of a vehicle;
    an elongated spindle swing arm with a first end and a second end, wherein the first end of the spindle swing arm is connected to the torsion axle shaft;
    a support swing arm with a first end and a second end, wherein the first end of the support swing arm is mounted to the mounting device so that the support swing arm rotates about a support swing arm pivot axis;
    a link device with a first end and a second end, wherein the first end of the link device is connected to the second end of the support swing arm and the second end of the link device is connected to the second end of the spindle swing arm; and
    a spring connected between the mounting device and the second end of the support swing arm.

14. The suspension assembly of claim 13 wherein the spring is located between the spindle swing arm and the support swing arm.

15. The suspension assembly of claim 13 wherein the second end of the spindle swing arm controls the movement of the spring through the link device so that that spring reacts to static loads in parallel with the rubber torsion axle assembly.

16. The suspension assembly of claim 13 wherein the spring is configured to bias the elongated central torsion axle shaft into a predetermined position to offset static loads so that the elongated central torsion axle shaft has an optimized range of motion for encountering dynamic loads.

17. The suspension assembly of claim 13 wherein the support swing arm further comprises:
   a cross member with a right end and a left end;
   an elongated right arm with a first end and second end, wherein the first end of the right arm is connected to the right end of the cross member, and wherein the second end of the right arm is pivotally attached to a right end of the mounting device;
   an elongated left arm with a first end and a second end, wherein the first end of the left arm is connected to the left end of the cross member, and wherein the second end of the left arm is pivotally attached to a left end of the mounting device;
   a link plate attached to the left end of the cross member, wherein the first end of the link device is connected to the link plate, wherein the spring is connected between the mounting device and the cross member.

18. The suspension assembly of claim 13 wherein the rubber torsion axle assembly includes the elongated central torsion axle shaft and is part of one of group consisting of: an existing trailer and an existing vehicle; and wherein the mounting device, elongated spindle swing arm, spring, support swing arm and link device are configured to be retrofitted to the rubber torsion axle assembly.

19. The suspension assembly of claim 13 wherein the spring is directly responsive to the spindle swing arm.

* * * * *